United States Patent [19]

Vlahos

[11] 4,007,487
[45] Feb. 8, 1977

[54] ELECTRONIC COMPOSITE PHOTOGRAPHY WITH COLOR CONTROL

[75] Inventor: Petro Vlahos, Tarzana, Calif.

[73] Assignee: The Association of Motion Picture and Television Producers Inc., Hollywood, Calif.

[22] Filed: Sept. 25, 1975

[21] Appl. No.: 616,685

[52] U.S. Cl. ............................. 358/22; 178/DIG. 6
[51] Int. Cl.$^2$ ........................................ H04N 9/535
[58] Field of Search .......... 358/22, 80; 178/DIG. 6

[56] References Cited

UNITED STATES PATENTS

| | | | |
|---|---|---|---|
| 3,595,987 | 7/1971 | Vlahos | 178/DIG. 6 |
| 3,778,542 | 12/1973 | Hanseman | 358/22 |

*Primary Examiner*—John C. Martin

[57] ABSTRACT

Improved electronic compositing procedures and apparatus are described, based typically on the blue screen process and suitable for processing motion pictures of professional quality and the like. The invention provides compensation for color impurity in the backing illumination over a continuous range of effective transparencies of the foreground scene. Applicant's previous method for limiting the blue video component for the foreground scene to permit reproduction of light blue foreground objects is improved by a dual limitation criterion which simultaneously suppresses blue flare light from the backing reflected by foreground objects of selected colors, typically including grey scale and flesh tones. The control signal for attenuating the background scene is developed as a difference function predominantly only at areas occupied by opaque or partially transparent foreground objects, and is developed predominantly as a ratio function at unobstructed backing areas, thereby compensating undesired variations in brightness of the backing illumination, while permitting desired shadows on the backing to be reproduced in the composite picture.

27 Claims, 2 Drawing Figures

ELECTRONIC COMPOSITE PHOTOGRAPHY WITH COLOR CONTROL

BACKGROUND OF THE INVENTION

This invention has to do generally with methods and apparatus by which separately produced video signals representing a foreground scene and a background scene may be combined electronically to produce a composite picture.

The invention relates more particularly to compositing systems which are capable of reproducing scenes in full color, and in which the foreground scene is initially recorded before a backing illuminated by light of a definite selected color, typically one of the primary colors employed in the reproduction process. In the resulting foreground record, areas corresponding to actual foreground objects can then be distinguished from areas of the backing by differences of hue, that is, by color discrimination.

Although many different backing colors may usefully be employed under special conditions, the most commonly selected backing color is substantially pure blue. Therefore, for clarity of description a blue backing will generally be assumed in the present discussion, and the process will ordinarily be referred to by the customary term, "blue screen process." However, any such simplifying assumptions and terminology, are not intended to imply that other colors may not be used, with corresponding modification of the procedure.

The present invention provides solutions for several distinct but closely related problems which have limited the performance of previously available electronic blue screen processes. Those problems typically relate to departures from theoretical perfection of the nature or the control of the backing illumination.

For example, it is not always feasible to maintain uniform intensity of illumination over the entire area of the backing. One aspect of the invention provides improved compensation for variations of backing brightness, and can handle even such relatively severe variations as shadows of the actors falling upon the backing.

Whereas the backing illumination is theoretically confined to one color component, typically the blue, a slight impurity of other colors is usually present, and may occasionally be appreciable. A further aspect of the invention provides especially accurate and effective compensation for such impurity in the backing illumination.

The invention further permits improved reproduction of foreground objects of a light blue color, especially in providing an effective criterion for distinguishing between naturally blue objects and blue light that is accidentally scattered from the backing and appears as a bluish edge lighting of foreground objects.

Solution of such problems is complicated by the fundamental need to maintain realistic reproduction of those areas of the foreground scene that are partially transparent. In such areas of the composite picture the partially transparent foreground object is seen with reduced brightness and appears to be superposed upon the partially visible background scene. The two scenes are thus directly intermingled.

Such partial transparency may be inherent in the foreground object, as in the case of glassware or smoke, or may be caused by blurring at the edge of a foreground image due to motion or to imperfect optical focus. When such a blurred edge occurs at the boundary between foreground and background scenes, there results a gradient of apparent transparency of the foreground object, extending from full opacity to full transparency. This full range of transparency must be portrayed with reasonable accuracy if the picture is not to be detected as a composite, destroying the intended illusion. A moving hand or arm frequently presents that problem in especially critical form because of its dramatic significance and because of the well known difficulty in reproducing flesh tones correctly.

The capability for reproducing partially transparent foreground areas is especially important in an electronic compositing system that is to be employed for producing motion pictures. For example, foreground and background motion picture films may be photographed separately in the normal way, and then scanned frame by frame to produce respective sets of color component video signals. Those signals can then be combined electronically, and the resulting composite video signals recorded photographically on color film to produce the desired composite motion picture. The apparent complexity of such procedure may be fully justified by the greater speed, reliability and flexibility of control in electronic operations as compared to conventional photographic operations in the dark room. However, the relatively high optical quality of theater projection, as compared to the home television screen, requires a correspondingly high level of perfection throughout the compositing process. Moreover, the appreciable exposure time of each frame in a motion picture camera tends to blurr the edges of moving objects more noticeably than the virtually instantaneous effective exposure of a television camera. Hence, the capability of a compositing process to handle partially transparent areas receives additional emphasis when the foreground scene has been initially recorded by a motion picture rather than a video camera.

An electronic compositing procedure intended to meet that challenge, as well as to provide composites of superior quality for television, is described and claimed in the present applicant's U.S. Pat. No. 3,595,987, issued on July 27, 1971 and entitled "Electronic Composite Photography." The present invention is particularly useful in connection with the apparatus and operations described in that patent, and will be described for the sake of clarity with special reference thereto. However, many aspects of the invention relate also to the so-called electronic blue screen process in general.

REVIEW OF THE PRIOR ART

The nature and importance of the present invention will best be understood after a review of the basic principles described in applicant's above mentioned U.S. Pat. No. 3,595,987, with emphasis upon some of the basic differences between that patent and other electronic compositing systems of the prior art.

The motion picture industry has long utilized various forms of the blue screen process in which the foreground and background scenes are combined by purely photographic techniques in the processing laboratory. Those photographic procedures are still in wide use, often embodying fundamental improvements contributed by the present applicant, including those described and claimed in U.S. Pat. No. 3,158,477, issued on Nov. 24, 1964. With the advent of color television, and the magnetic recording of video signals the broadcasting industry developed various electronic compositing procedures. A widely used system of that type, generally known as chroma key, is described by Kennedy and Gaskins of the National Broadcasting Co. in the December, 1959 issue of the Journal of the Society of Motion Picture and Television Engineers, pages 804 to 812.

The chroma key system, as described in that article, is specifically designed to accommodate backing illumination of any desired color. Circuitry is described for analyzing the foreground video color component signals to identify those areas of the scan which consist essentially of the selected backing color. For that purpose the chroma key system employs in principle a circular potentiometer to which the three color component video signals for the foreground scene are applied at equally spaced intervals. A signal representative of the transparency of the foreground scene is then derived as the difference between the voltages tapped from two wiping contacts 180° apart. For the typical case of a blue backing, that difference signal then equals the blue video signal minus the average of the green and red signals, that is, $B - (G + R)/2$. In chroma key, that signal is amplified and clipped to produce a sharp pulse suitable for switching the video output between the foreground camera and any desired synchronized source of video signals representing the selected background scene.

Although that chroma key process has been used extensively and effectively for television programming, it has shortcomings which make it unsatisfactory for applications in which optimum picture quality is required. Hence, it would not be suitable for electronically combining foreground and background video signals derived from motion picture films to produce ultimately a composite picture on film for exhibition in theaters. In particular, since the chroma key system switches abruptly between foreground and background scenes, it is clearly incapable of portraying realistically partially transparent foreground image areas, such as occur at a blurred edge of a foreground object.

Moreover, the mere substitution of a gradual fade from foreground to background video signals is quite incapable of representing such a blurred edge acceptably. At an area where the foreground scene is partially transparent all three color components of the background scene will ordinarily appear equally reduced in intensity, so that all three background video signals should be equally attenuated by the electronic compositing system. However, the three color component video signals for the foreground scene cannot all be treated in identical manner. On the one hand, the green and red foreground signals are due entirely to the foreground scene itself, assuming for clarity that the backing illumination is pure blue, and those signals can be transferred without modification to the composite. On the other hand, at such areas the blue signal typically includes appreciable components derived from the foreground scene and from the blue backing. The foreground component must be retained, the backing component suppressed. Moreover, the ratio of those two components does not bear any simple relation to the transparency of the foreground object, since it depends also upon the color and brightness of that object. A fundamental problem, then, is to divide the foreground blue signal correctly between the component to be suppressed and the component to be preserved in the composite picture.

Applicant's previous electronic compositing system, as typically described in the above mentioned U.S. Pat. No. 3,595,987, provides effective differential treatment of the foreground blue signal, as compared to the red and green signals, under the conditions outlined above.

With respect to the foreground video signals, the red and green color component signals are typically supplied without major modification to composite mixing circuits, where they are mixed with the suitably attenuated video signals representing the background scene. The blue foreground signal, however, is treated in a manner that effectively suppresses the component due to light from the backing, and only the component due to foreground objects is transmitted to the mixer. That discrimination is typically accomplished by subjecting the blue video signal to a limiting circuit which is responsive to a function of the green video signal, the output from the limiter being delivered as foreground blue component to the mixer. The portion of the initial blue video signal due to the backing is thereby suppressed at the limiter and does not appear explicitly. Thus, the blue foreground signal is processed quite differently from the red and green signals.

When the foreground scene includes no important objects containing more blue than green, as is generally preferred, the limiting action just described may simply prevent the blue foreground video signal from exceeding the green signal. If the foreground scene includes light blue objects that must be realistically portrayed, such as blue eyes, for example, the green signal is typically amplified by a suitable factor before being delivered as control signal to the limiter. The blue signal is thereby permitted to exceed the original green signal by the required percentage.

Proper attenuation of the background scene in areas wholly or partially obscured by the foreground scene is performed in applicant's previous system under control of a variable electrical signal representing the transparency of the foreground scene at each point. That signal is typically derived by effectively subtracting the foreground green video signal from the blue signal, producing a control signal of the form $B - G$, negative values of that expression being equivalent to zero. That signal has its maximum value, considered as unity for clarity of explanation, at clear backing areas where B corresponds to the full backing illumination and G is nominally zero. The background video signals are then delivered at full normal amplitude to the composite mixer. At opaque areas of the foreground scene the control signal is zero, since objects reflecting more blue than green light are typically excluded from the foreground. The background video signals are then fully suppressed. At intermediate values of the control signal, corresponding to intermediate transparencies of the foreground scene, the background video signals are supplied with appropriate attenuation to the mixer. If the foreground includes light blue areas that are important, full suppression of the background scene in such areas is typically obtained by amplifying G by a suitable factor before deriving the control signal. That amplification factor is typically the same as the factor described above in connection with limiting the foreground blue signal.

It may be useful to point out explicitly an important advantage in applicant's preferred derivation of the control signal representing foreground transparency in principle as $B - G$, rather than the signal $B - (G + R)/2$ employed in the earlier chroma key system and in more recent proposals. Those two functions are, of course, equivalent for all colors having equal red and green components. However, the function B − G permits more accurate portrayal of partially transparent objects of the particular class of colors containing equal amounts of blue and green, but a larger amount of red. The primary practical importance of that class is that it includes normal flesh tones. As pointed out above, blurred regions of the foreground scene are frequently due to moving hands or arms, the dramatic importance of which may emphasize any deficiency in their reproduction.

For example, consider the blurred edge of a hand which normally reflects equal amounts of blue and green light, but twice as much red light, say 25, 25 and 50%. At an image point where the transparency is 40%, only 60% of that normal foreground light will be reflected, giving values of 15, 15 and 30%. However, blue light from the backing will appear at 40% of its normal brightness, which is assumed to be 100. A control signal based on the function B − G will then have the value $(15 + 40) − 15$, or 40, correctly representing the assumed value of 40 % transparency. Therefore the background scene will appear at that point with its correct brightness. On the other hand, a control signal based on $B − (G + R)/2$ will have the lesser value $(15 + 40) − (15 + 30)/2$, or 32.5. The resulting deficiency of nearly one fifth in the proper background brightness will cause a dark boundary around moving objects having colors of the described type.

SUMMARY OF THE INVENTION

Backing Flare

One of the potential difficulties with all blue screen processes is the tendency for blue light to escape or "leak" from the backing to the foreground objects, producing a blue side lighting or flare. The resulting local distortion of natural colors is especially noticeable on white or grey scale objects, which reflect equal amounts of red, green and blue light and are sensitive to any departure from that relation; and on flesh tones, which appear unnatural unless reproduced correctly. That distortion is normally compensated automatically for such colors by the described procedures of applicant's above identified patent, since the limitation of the blue component necessarily eliminates any blue flare. However, if the foreground scene contains light blue objects which must be portrayed correctly, the problem arises of distinguishing electronically between the natural blue of such foreground objects, which must be preserved, and the spurious blue that may be added to white or flesh tones by backing flare, which must be suppressed.

An important object of the present invention is to provide a suitable criterion for distinguishing between the blue backing flare and a class of blue colors that are sometimes intentionally present in the foreground scene. That criterion makes use of a particular relationship that has been found to exist in nature between the red, green and blue components of such blue colors, namely, that the excess of the blue over the green is no greater than the excess of the green over the red.

On the basis of that relationship, the invention preserves the desired light blue colors by applying a dual condition upon the blue foreground component. That component is permitted to exceed the green component by a specified percentage, typically as described in the above identified patent, but subject to the further condition that such blue excess over green must not exceed the existing green excess over red. Since white and flesh tones contain essentially zero excess of green over red, that dual criterion eliminates degradation of those colors by blue flare from the backing, while simultaneously permitting the reproduction of blue eyes or a workman's blue denim shirt.

Backing Impurity

Another aspect of the invention permits effective compensation for presence of red or green light as impurity in the backing illumination. Experienced technicians ordinarily have little difficulty in obtaining satisfactorily pure backing color. If the backing is coated with good quality blue paint, for example, as is the normal practice, it can be illuminated by the same incandescent light that is used for lighting the foreground scene itself. The reflected backing light then typically contains only about five percent each of red and green impurity, which can readily be eliminated from the foreground video signals by slight adjustment of the conventional controls which are normally provided in color video electronic systems for equalizing the bias, gain and gamma of the red, green and blue video channels. For example, a small negative threshold bias of suitable size for the particular backing used will eliminate the green and red impurity in the backing area, and a small increase in gain will restore the desired signal level for normally lighted foreground objects. Occasionally, however, it is necessary or convenient to work with greater impurity in the backing illumination. Introduction of a large enough fixed bias to cancel such impurities would tend to disturb the contrast relations among the color components, and thereby appreciably distort the color rendition of the foreground scene.

The present invention compensates for such impurity in the backing illumination by subjecting the red and green video components to a dynamic bias. That bias is not only adjustable in accordance with the observed level of backing impurity, but also varies automatically in direct proportion to the transparency of the foreground scene. That arrangement does not affect the reproduction of normal colors in opaque areas of the foreground, yet it prevents any veiling of the background areas of the composite picture with red or green light from the backing, and also provides desirable compensation throughout the transitional edge regions between foreground and background areas.

Backing Brightness

Another aspect of the invention compensates for certain errors resulting from variations in brightness level of the backing, such as may result from imperfect illumination or from shadows thrown by actors approaching the screen too closely. The latter problem is especially important when the composite picture is required to show the background scene surrounding an actor's legs and even his feet. It is then necessary to bring the blue backing down onto the floor and allow the actor to walk directly on it. In order to compensate brightness differences in the backing area, the invention employs two distinct criteria for differentiating between foreground objects and the backing. One criterion is used for the foreground and most or all of each transitional edge area, while a different criterion is used for the remainder of that transitional area, if any, and for the backing area generally.

The criterion used in the backing area is essentially the ratio of two of the color components, typically the ratio of the blue to the green. Thus the green impurity that is present in the backing light, though typically only a few percent, may be utilized for identifying light from the backing. The ratio criterion does not respond appreciably to the light intensity. On the other hand, partially transparent areas of the foreground scene are preferably identified predominantly in terms of the excess of the blue video signal over the green signal, essentially as in applicant's above identified patent. Such use of a dual criterion permits smooth and realistic portrayal of boundary regions throughout a wider range of backing brightness, especially at edges having appreciable zones of partial transparency.

BRIEF DESCRIPTION OF THE DRAWING

A full understanding of the invention, and of its further objects and advantages, will be had from the following description of certain preferred manners of carrying it out, which description is to be read in conjunction with the accompanying drawing. The particulars of that description and of the drawing are intended only as illustration, and not as a limitation upon the scope of the invention, which is defined in the appended claims.

IN THE DRAWING

DESCRIPTION OF PREFERRED EMBODIMENTS

Figures 1, 2:
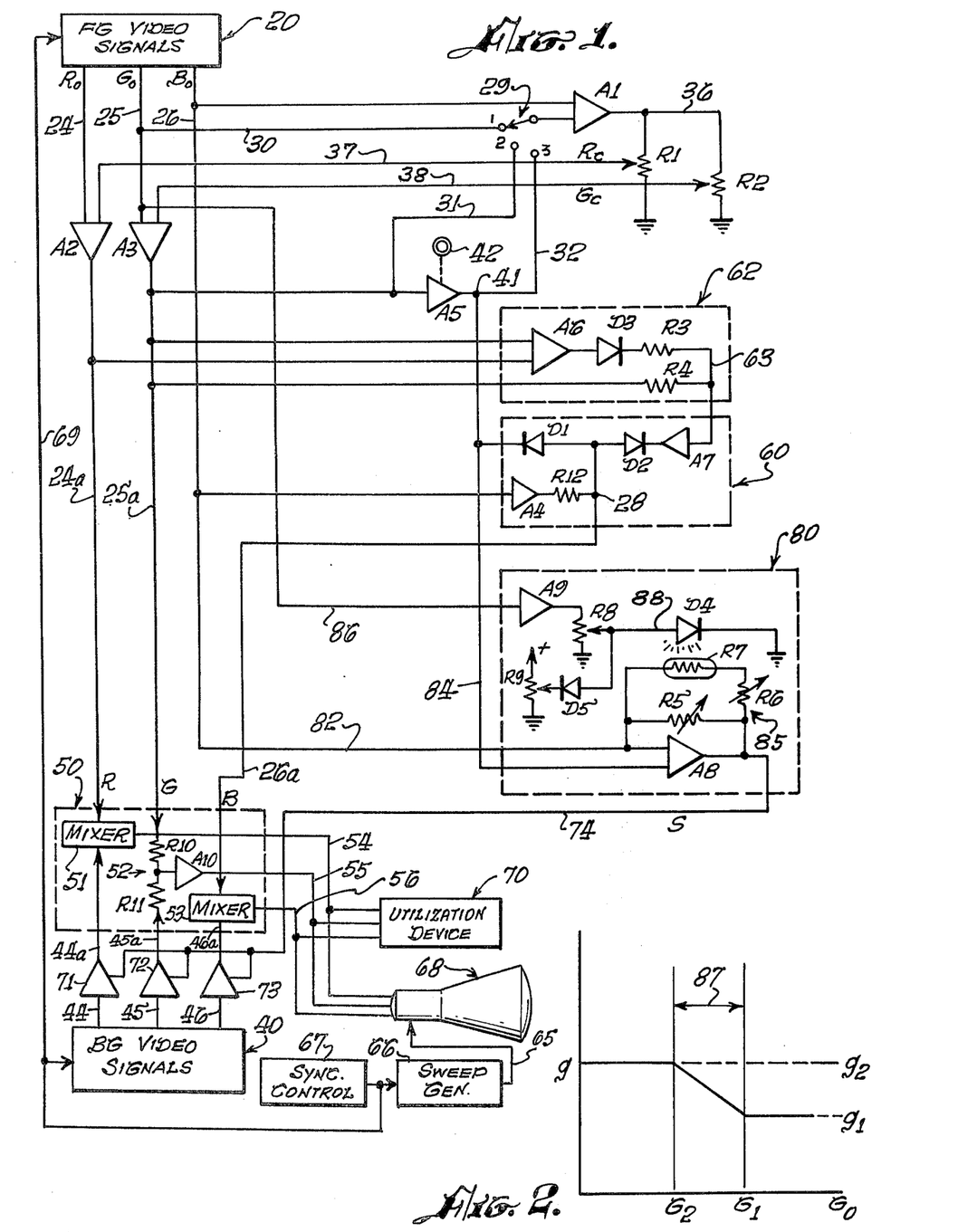
FIG. 1 is a schematic drawing representing an illustrative electronic compositing system embodying the invention.
FIG. 2 is a schematic graph illustrating certain aspects of typical operation of the system of FIG. 1.

In the illustrative compositing system shown schematically in the accompanying FIG. 1, a source of foreground video signals is indicated schematically at 20, typically comprising a color television or other camera recording a live foreground scene before a backing of definite color, assumed for the present description to be approximately pure blue. Many different procedures are well known for effectively illuminating the backing with substantially monochromatic light, for carrying out the actual video or motion picture photography of the foreground scene before such a backing, and for deriving video signals from a motion picture film. Hence those procedures do not require detailed description in the present specification.

The red, green and blue color component video signals $R_o$, $G_o$ and $B_o$, representing the foreground scene before the described backing, are supplied from source 20 on the respective lines 24, 25 and 26. Those signals are modified in a manner to be described, and the modified signals R, G and B are supplied via the lines 24a, 25a, and 26a to the composite mixer indicated at 50. Synchronized color composite video signals representing a selected background scene are supplied from the source 40 via the lines 44, 45 and 46 for the respective colors red, green and blue. Those background signals are processed by the respective variable gain amplifiers 71, 72 and 73 which are subject to a common gain control signal, supplied via the line 74. For purposes of description, that control signal may be considered to vary continuously from a maximum value at which the amplifiers have a gain of unity to a minimum value at which the gain is zero. The outputs from the respective amplifiers are supplied over the lines 44a, 45a and 46a as respective red, green and blue background video signals to mixer 50. All signals will be assumed positive for clarity of description.

Mixer 50 comprises the conventional adding circuits 51, 52 and 53 for mixing the respective color components for the foreground and background scenes, producing respective color component video signals for the composite picture on the lines 54, 55 and 56. As indicated for circuit 52, each adding circuit typically comprises an operational amplifier A10 which receives the two input signals via respective summing resistors R10 and R11. The composite video signals are supplied to any desired utilization device, indicated schematically at 70, which may comprise conventional means for encoding and broadcasting the composite signals, for example, or for recording the composite picture on film to produce a motion picture.

The composite video signals on lines 54, 55 and 56 are also preferably supplied to the television monitor cathode ray tube 68, which typically receives vertical and horizontal sweep control voltages via the lines 65 from the conventional sweep generating circuits 66. Those circuits are synchronized in conventional manner with foreground and background signal sources 20 and 40, as by timing signals supplied via the line 69 from the conventional synchronizing circuit 67. Thus, monitor tube 68 provides a visual display of the composite picture as it is being produced.

Backing Impurity

In accordance with one aspect of the present invention, discriminating circuitry is provided for correcting the red and green foreground video signals for any component that is due to impurity of those colors present in the backing illumination. Such impurity compensation is variably controlled so that it is substantially correct throughout a continuous range of variation of the effective transparency of the foreground scene.

In the present embodiment the conventional differential amplifier A1 receives as primary input the initial foreground blue signal $B_o$ from line 26. The amplifier receives as reference input a green foreground signal, which can be derived in a variety of ways. For clarity of illustration, FIG. 1 includes the three-position switch 29 by which any one of three specific green signals can be selected as reference input. However, in any particular system provision for only a single type of signal is ordinarily sufficient. Also, summing circuits of known design can provide linear combinations of two or more signal types.

With switch 29 at position (1), as shown, the reference input to amplifier A1 is the initial green signal $G_o$, supplied from line 25 via the line 30. The amplifier output on the line 36 thus represents the value $B_o - G_o$, except that the amplifier is biased in known manner so that its output is never negative, but is zero for all values of $B_o - G_o$ less than a selected threshold, which may be adjustable but is typically zero. That amplifier output, which is a representation of the effective transparency of the foreground scene, is supplied in parallel to the two potentiometers R1 and R2, connected between line 36 and ground. Variable fractions $Y_r$ and $Y_g$ of the signal $B_o - G_o$ are tapped on the lines 37 and 38 from the respective potentiometers, and are applied as offsetting bias corrections $R_c$ and $G_c$ for the initial red and green foreground video signals $R_o$ and $G_o$ on lines 24 and 25. As illustrated, the differential amplifiers A2 and A3 receive those respective video signals as primary inputs and receive the bias correction signals $R_c$ and $G_c$ as reference inputs. The amplifier outputs R and G on lines 24a and 25a are then $$R = R_o - Y_r(B_o - G_o) \quad (1)$$

$$G = G_o - Y_g(B_o - G_o) \quad (2)$$

With proper selection of $Y_r$ and $Y_g$, the values $R$ and $G$ defined by those equations exclude color impurity of the backing illumination and represent with good accuracy the respective color components due only to actual foreground objects. That will be seen more clearly from the following discussion.

The initial foreground signals $R_o$, $G_o$ and $B_o$ can in general be expressed as $$R_o = R_f + R_b \quad (3)$$

$$G_o = G_f + G_b \quad (4)$$

$$B_o = B_f + B_b \quad (5)$$

where the subscripts $f$ and $b$ denote the respective components due to light from the foreground itself and due to light from the backing transmitted by the partially transparent foreground. (In the present discussion we neglect the possibility of flare light from the backing reflected from a front surface of a foreground object.) The two backing components $R_b$ and $G_b$ are due entirely to impurity of the effective backing illumination. For a particular backing material and quality of illumination, those components can be assumed everywhere equal to respective uniform fractions $X_r$ and $X_g$ of the blue light $B_b$ from the backing, so that in general $$R_b = X_r B_b \quad (6)$$

$$G_b = X_g B_b \quad (7)$$

We now consider a "backing area" of the foreground scene, where there are no foreground objects and all light comes from the backing. The $f$ components in (3), (4) and (5) are then all zero, and the modified red and green signals of equations (1) and (2) become $$R = R_b - Y_r(B_b - G_b) \quad (1a)$$

$$G = G_b - Y_g(B_b - G_b) \quad (2a)$$

Replacing $R_b$ and $G_b$ by their values in (6) and (7), $$R = B_b(X_r - Y_r + Y_r X_g) \quad (1b)$$

$$G = B_b(X_g - Y_g + Y_g X_g) \quad (2b)$$

Since the only red and green light at a backing area is due to the impurity we are seeking to eliminate, the modified signals $R$ and $G$ should both be zero. Setting the parentheses in (1b) and (2b) respectively equal to zero, and solving for $Y_r$ and $Y_g$, $$Y_r = X_r/(1 - X_g) \quad (8)$$

$$Y_g = X_g/(1 - X_g) \quad (9)$$

Thus, if potentiometers R1 and R2 are adjusted in accordance with (8) and (9), the two modified signals $R$ and $G$ will have the value zero at all areas of unobstructed backing, corresponding to full compensation of the color impurity of the backing illumination. Insertion of those values in equations (1) and (2) yields general equations for the modified signals:

$$R = R_o - X_r(B_o - G_o)/(1 - X_g) \quad (1c)$$

$$G = G_o - X_g(B_o - G_o)/(1 - X_g) \quad (2c)$$

As the scan passes from an unobstructed backing area to a typical foreground object, $B_o - G_o$ decreases in approximate correspondence to the effective transparency of the foreground object. Thus the described illustrative dynamic bias circuits provide effective compensation of backing impurity throughout the transition region. At opaque objects, $B_o$ is normally equal to or less than $G_o$, making $B_o - G_o$ effectively zero due to the described threshold action of A1; hence the bias circuits are entirely ineffective at normal foreground areas.

If switch 29 in FIG. 1 is shifted to position (2) and the line 31, the compensating red and green bias voltages are derived from the modified green signal $G$ on line 25a, which has already been compensated for backing impurity.

With that modification, previous equations (1) and (2) for the compensated signals $R$ and $G$ on lines 24a and 25a become $$R = R_o - Z_r(B_o - G) \quad (1')$$

$$G = G_o - Z_g(B_o - G) \quad (2')$$

Where the Z's represent the modified settings of R1 and R2. At unobstructed backing areas, where the foreground components of equations (3), (4) and (5) are all zero, those equations become $$R = R_b - Z_r(B_b - G) \quad (1b')$$

$$G = G_b - Z_g(B_b - G) \quad (2a')$$

To find the values of $Z_r$ and $Z_g$ which give correct impurity compensation, we replace $R_b$ and $G_b$ from (6) and (7) and set R and G equal to zero, giving R $$Z_r = X_r \quad (8')$$

$$Z_g = X_g \quad (9')$$

The general equations corresponding to previous equations (1c) and (2c) are then $$R = R_o - X_r(B_o - G) \quad (1c')$$

$$G = G_o - X_g(B_o - G) \quad (2c')$$

Solution of equation (2c') for G gives $$G = (G_o - X_g B_o)/(1 - X_g) \quad (2d)$$

which is algebraically equivalent to equation (2c) for switch position (1). However, equations (2c) and (2c') exhibit the respective threshold actions of amplifier A1 more clearly than equation (2d). Equations (1c) and (1c') for the red component corrections are also equivalent, as can be seen by replacing $G$ in (1c') by its value from (2d).

Hence, assuming appropriate circuit adjustments according to (8), (9), or (8'), (9'), equivalent results are obtainable by deriving the bias signals either from $G_o$ or from $G$, at least for foreground scenes without any objects of importance which contain more blue than green. In either case the resulting red and green compensated signals $R$ and $G$ on lines 24a and 25a are typically supplied directly to mixer 50, as indicated in FIG. 1. Compensated green signal $G$ is also generally suitable for two additional functions: for establishing a limit which the blue foreground signal supplied to mixer 50 is not allowed to exceed, and for deriving a control signal S of the form $B_o - G$ for attenuating the background video signals at picture areas occupied by foreground objects.

However, when the foreground scene includes light blue areas that must be properly reproduced, the blue foreground signal must be allowed to exceed the green signal G at least to the extent corresponding to such blue hues; and background control signal S must fully disable the background video at such areas, despite the fact that $B_o - G$ there has a positive value which would ordinarily indicate partial transparency of the foreground scene. Both of those modifications are typically accomplished by increasing the effective value of the green signal that is used for limiting $B_o$ and for deriving control signal S. In the present circuit that increase is produced directly by the variable gain amplifier A5, which corresponds generally to amplifier 64 of applicant's previous U.S. Pat. No. 3,595,987.

The gain of A5 is normally unity, but may be manually adjusted at 42 to depart from unity by a fraction M, which has a typical range from about minus 10% to about plus 30%. Thus, the green signal at the output of A5 may be expressed as $G(1 + M)$, where M is typically set in accordance with the maximum blue content of the objects to be included in any particular foreground scene. That amplified green signal is supplied via the junction 41 to limiting circuit 60 and also to circuit 80 for deriving control signal S, which circuits are preferably of the improved type to be more fully described below.

In presence of important foreground objects of light blue color, the impurity compensating circuits continue to act as already described at all areas not occupied by such objects. At the blue objects themselves, however, a slight reduction of brightness typically occurs, without significant change of hue. Considering an opaque blue object for definiteness, the inputs to amplifier A1 exhibit a small excess of $B_o$ over G or $G_o$, according as switch 29 is at position (1) or (2). That excess appears in equation (2c) or (2c′) as blue light that has been transmitted from the backing with the accompanying small fraction $X_g$ of green impurity. A corresponding correction signal $G_c$ is delivered to amplifier A3 and is subtracted from initial green signal $G_o$. The modified green signal G at the output of A3 is therefore less than $G_o$, but only by a quantity of second order, typically no more than 5%. A similar deficit in the modified red component R is typically produced.

That slight reduction of G does not alter the hue of an object having the blue color for which the gain of A5 has been set, since the value of the modified blue component B on line 26A is correspondingly reduced by the limiting action of circuit 60. The effect is therefore primarily a slight reduction in apparent brightness, which is ordinarily scarcely detectable.

That small change of brightness of blue foreground objects can be largely avoided, if desired, by suitably increasing the reference input signal to amplifier A1. For example, that reference signal may be taken from the output of amplifier A5, as by shifting switch 29 in FIG. 1 to position (3). The output from A1 on line 36 is then of the form $B_o - G(1 + M)$, where $1 + M$ is the gain of A5 and M represents the fractional excess of blue over green in the blue foreground objects in question, as described above. Alternatively, with switch 29 at position (2) an amplifier with adjustable gain may be inserted in line 31 and set in accordance with the setting of A5. In systems in which the derivation of control signal S on line 74 does not include the improved circuitry to be described, a functionally equivalent signal on line 36 can be tapped from that signal S, entirely replacing amplifier A1. Whatever the source of the modified signal on line 36, typified by switch position (3), the factor $1 + M$ has no effect when $G = 0$. Therefore, the previous analysis for switch position (2) can be applied virtually without change to find the proper setting of R1 and R2 for switch position (3), leading to equations of the same form as (8′) and (9′). The general equations (1c′) and (2c′) then become $$R = R_o - X_r[B_o - G(1 + M)] \qquad (1c'')$$

$$G = G_o - X_g[B_o - G(1 + M)] \qquad (2c'')$$

At opaque blue objects for which $(B_o - G_o)/G = M$, substitution of that value for M in (2c″) and solution of the resulting equation for G gives $G = G_o$. Hence, the green component is reproduced at its full initial value. Colors for which $B_o$ does not exceed $G_o$ are also correctly reproduced, since the bracket in (2c″) then has a negative value, and the described threshold action of amplifier A1 gives it an effective value of zero.

Accordingly, derivation of the color compensation signals from $G(1 + M)$, as by switch position (3), may be preferable to derivation from $G_o$ or G, as by switch positions (1) and (2), especially if frequent use of blue objects in the foreground scene is anticipated.

In actual practice, the slightly greater complexity of criteria (8) and (9) for setting R1 and R2, as compared to criteria (8′) and (9′), is not a practical consideration, since adjustment of R1 and R2 of FIG. 1 is typically made empirically. Such adjustment is greatly facilitated by using monitor 68 as a waveform monitor to observe the actual voltage level of the modified signals R and G at a "backing area." That operation is illustrative of the broad capability of the cathode ray tube monitor for providing a window to the system's functions. The form in which each function is displayed is selected by the operator so as to be most useful in observing or adjusting a given parameter. For the present specific adjustment of G, for example, the monitor is adjusted to display only the green component video signal, and the background signals from source 40 are disabled, as by grounding line 74 to apply a zero control signal S to amplifiers 71, 72 and 73. The green bias factor $Y_g$ is then increased by adjustment of R2 till a backing area unobstructed by the foreground just appears black on the monitor, indicating that signal G of equation (2a) is zero and hence that $Y_g$ has the correct value to compensate the existing green impurity of the backing illumination. Proper compensation of the red impurity is typically adjusted with corresponding monitoring procedure.

Such adjustment does not require separate or explicit determination of the fractions $X_r$ and $X_g$ of equations (6) and (7). Moreover, the adjustment does not require differential amplifier A1 to have any particular gain. Thus, the described adjustment at R1 and R2 may be supplemented by providing a variable gain amplifier at A1, or may be replaced by variable gain circuitry of any suitable type. In particular, separate differential amplifiers A1r and A1g may be provided for the red and green compensation circuits, each amplifier having variable gain responsive to an applied voltage. R1 and R2 of FIG. 1 are then replaced by respective means for adjusting those control voltages, such as potentiometers connected between a common source of voltage and ground.

Backing Flare

In order to compensate backing flare even in presence of light blue foreground objects, the initial foreground blue video signal $B_o$ on line 26 is modified before supply via line 26a to mixer 50 by the dual limiting circuitry shown illustratively at 60. That circuitry applies two distinct limits upon the extent to which the modified blue signal B is allowed to exceed the modified green signal G. One limit is typically adjustable manually to accommodate whatever foreground blue colors must be reproduced, as in applicant's previous system. The other limit is imposed in accordance with the present invention, and is responsive to the excess of a green signal $G_o$ or G over the corresponding red signal $R_o$ or R.

Limiter 60 typically comprises the isolating amplifier A4 and resistance R12 between lines 26 and 26a, and the diodes D1 and D2. The anodes of both diodes are connected to line 26a at the junction 28. The cathode of D1 is connected via the junction 41 to the output of the variable gain amplifier A5, already described. Thus, the signal supplied to limiting diode D1 may be expressed as $G(1 + M)$, where M represents the fractional excess of blue over green for the blue foreground objects to be portrayed. Amplifier A4 and diode D1 correspond generally to limiter 60 of applicant's previous U.S. Pat. No. 3,595,987. It is noted, in particular, that this action causes B to be zero whenever G is zero, regardless of the value of M.

The cathode of diode D2 receives a controlling signal developed by the circuit shown illustratively at 62. The differential operational amplifier A6 receives as primary input the modified green signal G from line 25a, and as reference input the modified red signal R from line 24a. The output $G - R$ from A6 is supplied to the summing operational amplifier A7 via the diode D3, which passes only positive signals, and the summing resistance R3. A7 also receives via the summing resistance R4 the green signal G directly from line 25a. The output from A7 to the cathode of D2 thus represents the sum of G and the difference signal $G - R$.

The dual action of limiting circuit 60 therefore allows the modified blue signal B on line 26a to exceed G only to the extent that G exceeds R; and in any case does not allow B to exceed the value $G(1 + M)$ on line 41. That action allows the blue signal supplied to the mixer to exceed the green signal for areas of the foreground scene that are blue, thereby permitting light blue colors to be reproduced correctly; but prevents that blue signal from exceeding the green signal for areas of the foreground scene having colors which include flesh tones and shades of white, thereby preventing blue flare light from the backing from degrading those particularly important and sensitive colors.

Circuit 62 may be considered to discriminate between areas of the foreground scene having a naturally blue color, for which line 63 receives a positive signal, and areas of selected colors containing at least as much red as green, for which line 63 receives no signal. Limiting circuit 60 then acts in response to that discrimination, limiting blue signal B in the second case to G and to a value exceeding G in the first case.

Backing Brightness

A further aspect of the invention relates to circuit means for generating a control signal for variably attenuating the video signals representing the selected background scene, such that the control signal represents essentially a ratio function at background areas of the composite picture and predominantly represents a difference function at foreground and transition areas.

Such a dual function signal can be developed by many different types of instrumentation. The present circuit is illustrative of circuit means acting normally to produce one functional relation, with modulating means for altering the circuit action during a selected portion of the range of operation in such a way as to produce the second functional relation. Alternatively, entirely distinct circuits may be provided for producing the difference function and the ratio function, respectively, with switching means for selectively enabling one circuit or the other in response to suitable range discriminating means. In the preferred arrangement shown, the normal circuit action produces a difference function, and the action is modulated to produce a ratio function under selective control of a suitable discriminating signal. That signal is derived from one or more of the non-blue color components, which are present in the backing illumination in at least measurable proportions, and which therefore vary directly with the intensity of that illumination. It is generally preferred to derive the discriminating signal from the initial green signal $G_o$. The modulating means can then be viewed as comprising discriminating means for detecting selected backing areas in terms of a range of $G_o$, and switching means for shifting the main signal generating circuit between its two modes of operation in response to such detection.

As illustratively shown, circuit 80 for developing control signal S comprises the differential operational amplifier A8, which receives as signal input the initial blue signal $B_o$ via the line 82 from line 26, and receives as reference input via the line 84 a suitable signal derived from one or more color components other than blue. In systems like the present one, which include amplifiers A3 and A5 or their equivalents, the normally preferred reference signal is the modified and amplified green signal $G(1 + M)$ from junction 41. The output control signal S on line 74 can thus be expressed as $$S = [B_o - G(B + M)]g \qquad (10)$$

where g represents the gain of amplifier A8 and M is the previously described constant, ordinarily zero, representing the adjustment of amplifier A5. When g is constant control signal S is then a difference function, determined essentially by $B_o - G$ and corresponding generally to signal $E_c$ of applicant's previous U.S. Pat. No. 3,595,987.

Modulation of that normal action of circuit 80 to produce a ratio function is accomplished by altering the gain g of amplifier A8. Amplifiers are well known in which the gain is variable in response to an applied control voltage, which may be derived, for example, as the voltage drop across a variable resistance. The gain of amplifier A8 is controlled directly, however, by varying the effective resistance of the negative feedback circuit 85. That feedback circuit is designed in any suitable manner so that its resistance varies as a definite function of initial green signal $G_o$ when that signal lies in a selected modulation range. That modulation range is preferably adjustable, and typically extends from an upper limit $G_1$, characteristic of the green impurity contained in the brightest portions of the blue backing, to a lower limit $G_2$ which represents the green impurity at the darkest areas of the blue backing at which the background scene is desired to appear in the composite picture with its full normal brightness. The feedback resistance for values of $G_o$ above $G_1$ and below $G_2$ typically remains approximately constant at respective values which are preferably adjustable and which lead to respective selected values $g_1$ and $g_2$ of the amplifier gain, $g_1$ being lower than $g_2$. The resulting behavior of $g$ as a function of green signal $G_o$ is plotted schematically in FIG. 2, the variation of $g$ within the modulation range 87 being represented as linear for clarity of illustration.

The present illustrative feedback circuit 85 of amplifier A8 comprises the photosensitive resistance R7, typically of silicon, which is variably illuminated by the light emitting diode D4. That diode is typically a conventional gallium arsenide diode such as is commercially available as a unit with the resistance. The diode has a definite threshold voltage below which it is dark, and emits light at an intensity directly proportional to current supplied to it at voltages above that threshold. The voltage supplied to D4 via the line 88 represents a specially shaped function of the initial green signal $G_o$ from the line 86. As shown signal $G_o$ is first amplified by the amplifier A9, which may incorporate nonlinear shaping circuits of conventional type, and is then variably attenuated by adjustment of the potentiometer R8. The resulting signal on line 88 is preferably limited to a maximum value that is adjustable. In the present circuit, limiting action of the diode D5 is adjustable by the potentiometer R9, connected between ground and a source of positive voltage.

Thus, green video signal $G_o$ is effective to energize D4 and vary the resistance of photosensitive R7 only between a lower limit $G_2$ which corresponds to the threshold of D4 and is adjustable at R8, and an upper limit $G_1$ which corresponds to the limiting action of D5 and is adjustable at R9 for each setting of R8. Within that operating range the resistance of R7 varies as a definite inverse function of $G_o$. For values of $G_o$ above $G_1$ the resistance of R7 has a constant and relatively low value for any given settings of R8 and R9, due to limiting action of D5; whereas for $G_o$ less than G2 diode D4 is dark and the resistance of R7 is constant at its relatively high dark value.

Feedback circuit 85 preferably includes means for adjusting the relationship between the resistance of R7 and the resulting effective feedback resistance, and hence the gain $g$, of amplifier A8. As typically shown, the variable resistance R5 is connected in shunt to R7 and provides convenient adjustment of $g_2$, the gain for $G_o$ less than $G_2$; and the variable resistance R6 is connected in series with R7 and provides convenient adjustment of $g_1$, the gain for $G_o$ larger than $G_1$.

In actual practice, the various adjustments of circuit 85 are typically set with the aid of a suitable monitor, represented by cathode ray tube 68, which is caused to indicate the desired parameter in conventional manner as already indicated. Assume, for example, that the backing is non-uniformly illuminated with blue light which contains a constant fractional green impurity, some areas appearing at normal intensity, say 1.0, and other areas at only 0.7, or 30% low. Also, assume that a foreground object sometimes casts a shadow on the backing which may reduce the illumination in the shadow area to 0.5. Depending upon the nature of the scene, appearance of the shadow in the final composite picture may or may not be desired. We assume initially that the shadow is not wanted.

Under those illustrative conditions, light emitting diode D4 is first disabled, as by setting R8 to its minimum value. R5 is then so adjusted that, at the 0.5 shadow area of the backing, control signal $S$ equals its critical value, say 1.0 volt, which just fully enables the background scene at amplifiers 71, 72 and 73. That adjustment sets the gain $g_2$ in FIG. 2 sufficiently high that all backing shadows less dense than 0.5 will be eliminated from the final composite.

Potentiometer R8 is then adjusted upward (with R9 at a high level) until the signal on line 88 just exceeds the threshold of D4 at the same shadow area of the backing. The resulting threshold light emission from D4 can be observed directly, or can be detected by observing the resulting slight reduction of $S$. The latter effect is preferably made more sensitive by setting R6 to a low value. That adjustment of R8 places the lower limit $G_2$ of modulation range 87 (FIG. 2) at the desired value of $G_o$, corresponding in the present instance to the shadow level 0.5.

The slope of the gain curve of FIG. 2 within modulation range 87 is then typically set by adjustment of R6 so that control signal $S$ has the same critical value at the brightest areas of the backing as at the 0.5 shadow area. The smaller the value of R6, the more steeply does the gain $g$ decrease with increasing value of $G_o$. At the correct slope, an increase in the blue light component $B_o$ from the backing is just compensated by the decrease of amplifier gain that results from the accompanying increase in the green light component $G_o$. Hence control signal $S$ of equation (10) remains approximately constant within the modulation range.

The upper limit $G_1$ of modulation range 87 (FIG. 2) may be set to the desired value of $G_o$ by adjustment of R9, causing the gain to remain constant at the value $g_1$ for all higher values of $G_o$. Upper limit $G_1$ is typically set at the brightest area of the backing, or at an area that can be considered normally illuminated, and that differs only negligibly from the brightest area.

With the described adjustments, circuit 80 has two distinct modes of operation. When initial green signal $G_o$ is above or below modulation range 87 of FIG. 2, the circuit operates in its difference mode, producing a control signal $S$ which varies with a difference function, typically given by the bracket in equation (10) and representing the effective transparency of a foreground object. When $G_o$ is within modulation range 87, the imposed variation of $g$ causes signal $S$ to vary as a ratio function, in the sense that it then represents the ratio $B_o/G_o$ rather than the difference expression of equation (10). At unobstructed areas of the backing, that ratio depends only upon the fractional impurity of green light in the blue backing illumination and is independent of the brightness. Hence, within the modulation range where the ratio mode of operation is fully effective, control signal $S$ has the same value over the entire range of backing illumination, extending in the present example from 0.5 to 1.0.

That stabilization of signal $S$ has the useful effect of insuring complete blanking of the background scene even at abnormally dark areas of the backing, and of doing so without significantly altering the reproduction of transition areas. In previous practice, if the backing included poorly illuminated areas, an adequate value of S in those areas could, of course, be obtained by manually increasing the gain of the signal amplifier, such as amplifier 74 of applicant's previously cited U.S. Pat. No. 3,595,987, for example, either with or without limitation of the amplifier input at limiter 76 of that patent. However, such adjustment tended to disturb the reproduction of transition regions. In the present system, the automatic variation of the gain $g$ of amplifier A8 may be considered to produce such additional amplification of $S$ selectively at the portions of the backing that are less than fully illuminated.

In discussing operation of the present aspect of the invention at transition regions where the foreground object appears partially transparent, it is convenient to consider the "normal" level of amplifier gain $g$ to be the relatively low value $g_1$ which is set by limiting action of D5 when the initial green signal $G_o$ is at or above the upper limit $G_1$ of modulation range 87. That normal gain $g_1$ applies at brightly lighted backing areas that are unobstructed by foreground objects; and it applies also at most opaque foreground objects, since the green content of such objects ordinarily exceeds upper limit $G_1$, often by a considerable margin. To be sure, the limiting action at $G_1$ does not affect reproduction of opaque foreground objects, since for such objects the bracket in equation (10) is zero, making $S$ zero regardless of the amplifier gain. However, that limiting action typically plays an important role in transition areas.

Within a transition from a brightly lighted backing area to a typical foreground object, the initial green signal $G_o$ shifts from a backing value close to $G_1$ to a higher foreground value. If there were no limiting action, that increase in $G_o$ would produce a corresponding decrease of gain within the transition region, causing control signal $S$ to decrease more rapidly than the transparency of the foreground object, represented typically by $B_o - G$. The apparent brightness of the background scene would then decrease more rapidly than the actual increase of apparent brightness of the foreground scene, producing a dark band in the composite picture. That is prevented by the limiting action at $G_1$, which holds the amplifier gain $g$ continuously at its "normal" value $g_1$ throughout the transition. Thus, the transition between brightly lighted backing and normal foreground object is reproduced just as if the system had no capability for the ratio mode of operation.

The result is only slightly different for a transition to a normal foreground object from an abnormally dark backing area, such as a shadow, where $G_o$ equals the lower limit $G_2$ of modulation range 87. In such a transition $G_o$ typically increases through the entire modulation range and attains the upper limit $G_1$ within a relatively small outer portion of the transition region, ordinarily less than one quarter. It then continues to increase from $G_1$ to the value characteristic of the particular foreground object. Hence, $S$ shifts relatively rapidly part of the way from its background enabling value toward its background suppressing value within the outer portion of the transition region. However, once the gain has become stationary at $g_1$, the remainder of the transition to the foreground scene is carried out in normal response to the difference function. Therefore, the transition at a backing shadow area is not markedly affected. Moreover, that departure from normal occurs at the relatively rare foreground edges that are adjacent backing shadows, whereas the more numerous edges at fully lighted backing areas are rendered normally.

For transitions to foreground objects that have an abnormally low green signal $G_o$, which may be due to low illumination or to a red or unusually dark color, for example, the above described difference of behavior between normal and below normal backing illumination is reversed. During a transition from a dark shadow area of the backing to a foreground object for which $G_o$ is appreciably less than lower limit $G_2$, the amplifier gain remains constant at the relatively high limit value $g_2$ throughout the transition. Control signal $S$ therefore shifts from background enabling to background suppressing values along a normal path. On the other hand, for a transition from a normally lighted backing to such a dark foreground object, the present system causes the ratio mode of operation to extend from the backing area into the outer part of the transition region, producing an increase of gain, typically from $g_1$ to $g_2$. Signal $S$ therefore decreases more slowly than normal during that initial portion of the transition, causing the background scene to decrease in brightness more slowly than normal at that area. Such effects are scarcely noticeable at blurred edges of dark foreground objects due to their low brightness. However, in the case of dark objects that are actually partially transparent, such as black smoke or dark glass, the persistence of the ratio mode into the transition region shortens the scale of transparency that can be reproduced, causing the most transparent areas of the dark object to disappear.

If the foreground object has a green content $G_o$ between the two limits $G_1$ and $G_2$ of modulation range 87, any change of gain that ocurs during the transition is less than $g_1 - g_2$, and that change is ordinarily distributed uniformly throughout the transition region. Both those characteristics tend to conceal any departure from normal appearance in the composite picture.

Selective Retention of Backing Shadows

Depending upon the nature of the scene, it is sometimes desirable to retain a shadow that falls on the backing, allowing it to appear as a darkened area of the background scene in the composite picture. If all backing shadows are to be treated in that way, diode D4 can simply be disabled by setting potentiometer R8 at the grounded end of its winding. The gain $g$ of amplifier A8 is then responsive mainly to R5, which can be set to enable full background intensity only at full backing brightness. If only the darkest backing shadows are desired to appear in the final picture, lighter shadows being eliminated, the circuit is so adjusted that the signal supplied to light emitting diode D4 is below the diode threshold for the darker shadows, but above that threshold for the shadows that are to be eliminated. For example, R8 may be set to bring D4 to its threshold at a value of $G_o$ corresponding to 70% of normal backing brightness, thereby setting lower limit $G_2$ of modulation range 87 at that point. Control signal $S$ then conforms to the ratio mode for levels of backing illumination above 70% of normal. Darker shadow areas are transferred to the background scene of the composite picture, but only to the extent that their brightness falls below 70% of normal.

The threshold of D4 thus illustrates a circuit parameter for distinguishing between backing shadows of two different levels which are to be treated differently in the composite picture. Additional flexibility in setting the effective threshold of D4 is obtainable, for example, by connecting the cathode of D4 to a source of adjustable positive or negative potential, rather than to ground as illustrated.

Many circuit details which would be included in a practical system have been omitted from FIG. 1 for clarity of illustration. Such features include, for example, optical and electronic filters, biasing and clipping circuits, phase control devices for maintaining proper phase relations among the various signals, and variable gain amplifiers for such purposes as adjusting the effective contrast or gamma of the various color components, equalizing circuit gain, compensating filter losses, and compensating the relative spectral sensitivity of photographic emulsions or of the output cathode ray tube. Such amplifiers may be designed in known manner to produce a nonlinear response, as to compensate photographic effects at the toe portions of the characteristic curve of a photographic emulsion. Signal controls of such types are well known, in and of themselves, and can be provided as needed to meet the requirements of any particular system.

As will be evident to those skilled in the art, many modifications in addition to those already explicitly described or suggested can be made in the particulars of the above disclosure without departing from the essence of the present invention.

I claim:

1. In combination with an electronic system for producing a composite color picture from foreground and background video signals, the foreground signals representing respective color components of a foreground scene having areas of different effective transparency against a backing effectively illuminated with light which is predominantly confined to one of said colors and which contains an impurity of at least one other color; the improvement comprising
means for substantially compensating said color impurity throughout a continuous range of said transparency.

2. Combination according to claim 1 wherein said compensating means comprise
means for deriving a control signal that represents essentially the effective transparency of the foreground scene,
and means for modifying the foreground video signal for said other color in response to the control signal.

3. Combination according to claim 1 wherein said compensating means comprise
means for deriving a biasing signal that is essentially proportional to the effective transparency of the foreground scene with a factor of proportionality that is adjustable in accordance with the magnitude of said impurity,
and means for effectively subtracting the biasing signal from the foreground video signal for said other color.

4. Combination according to claim 3 wherein said signal deriving means comprise
means for effectively subtracting said foreground video signal for said other color from said foreground video signal for said one color to obtain a difference signal,
and means for variably attenuating the difference signal to obtain said biasing signal.

5. Combination according to claim 3 wherein said signal deriving means comprise
means for effectively subtracting from said foreground video signal for said one color the difference of the foreground video signal for said other color and said biasing signal to obtain a difference signal,
and means for variably attenuating the difference signal to obtain said biasing signal.

6. Combination according to claim 1 wherein said compensating means comprise
means for deriving a biasing signal that is substantially equal to $X(B_o - G_o)/(1 - X)$, where $B_o$ and $G_o$ represent the foreground video signals for said one color and for said other color, respectively, and $X$ represents the magnitude of said impurity as a fraction of said backing illumination,
and means for effectively subtracting said biasing signal from the foreground video signal for said other color.

7. Combination according to claim 1 wherein said compensating means comprise
means for deriving a biasing signal that is substantially equal to $X(B_o - G)$ where $B_o$ represents the foreground video signal for said one color, $G$ represents the foreground video signal for said other color after said compensation, and $X$ represents the magnitude of said impurity as a fraction of said backing illumination, .
and means for effectively subtracting said biasing signal from the foreground video signal for said other color.

8. Combination according to claim 1 wherein said backing illumination contains respective impurities of at least two other colors, said compensating means comprising
means for deriving a control signal that varies in direct relation to the effective transparency of the foreground scene,
means for developing for each of said other colors a biasing signal that is a variable fraction of the control signal,
and means for effectively reducing the foreground video signals for said other colors in response to the respective biasing signals.

9. In combination with an electronic system for producing a composite picture from foreground and background video signals, the foreground signals representing respective red, green and blue color components of a foreground scene against a blue backing; the improvement comprising
means for modifying the foreground blue video signal to eliminate components due to blue light received directly from the backing and components due to blue backing light reflected from foreground objects of selected colors including those having equal blue and green content, while retaining components due to reflection of normal illumination by naturally light blue foreground objects.

10. Combination according to claim 9 wherein said signal modifying means comprise
means for permitting the foreground blue video signal to exceed the foreground green video signal only to the extent that said green video signal exceeds the foreground red video signal.

11. Combination according to claim 9 wherein said signal modifying means comprise
discriminating means for distinguishing in the foreground scene first areas that have selected naturally blue colors and second areas that have selected colors including flesh tones and shades of white, and means responsive to the discriminating means for limiting the blue video signal in said second areas to a value which is substantially equal to the foreground green video signal, and for limiting the blue video signal in said first areas to a value which exceeds the green video signal.

12. Combination according to claim 9 wherein said signal modifying means comprise first limiting means for limiting said blue video signal to a value which exceeds the green video signal by a predetermined factor, and second limiting means for limiting said blue video signal to a value approximately corresponding to the sum of the green video signal and the excess of the green video signal over the red video signal.

13. Combination according to claim 12 wherein said second limiting means comprise differential means responsive to said red and green video signals for producing a difference signal representing the excess of the green video signal over the red video signal, means for summing said difference signal and said green video signal to produce a control signal, and means for limiting said blue video signal in response to the control signal.

14. In combination with an electronic system for producing a composite picture from foreground and background video signals, the foreground signals representing respective red, green and blue color components of a foreground scene against a blue backing; the improvement comprising means for limiting the blue content of grey scale and flesh colored foreground objects to substantially eliminate blue flare from the backing while preserving the blue content of light blue foreground objects.

15. In an electronic system for producing a composite color picture from foreground and background video signals, the foreground signals representing respective color components of a foreground scene against a backing effectively illuminated with light which is predominantly confined to one of said colors and which contains a minor proportion of light of at least one other color, said system including means for deriving a control signal which normally represents essentially the effective transparency of the foreground scene, and means for variably suppressing the background video signals in response to said control signal; the improvement comprising means for amplifying the control signal in inverse relation to the foreground video signal for said other color.

16. Improvement according to claim 15 including means for disabling said signal modifying means at values of the foreground video signal for said other color exceeding a predetermined limit.

17. Improvement according to claim 15 wherein said signal modifying means comprise means acting selectively within a predetermined range of values of the foreground video signal for said other color to cause said control signal to vary approximately in proportion to the ratio of said foreground video signal for said one color to the foreground video signal for said other color.

18. Improvement according to claim 15 wherein said signal modifying means comprise an amplifier having a negative feedback circuit including photosensitive resistance means, light emitting diode means for variably illuminating the resistance means, and circuit means for variably energizing the diode means under control of said foreground video signal for said other color within a selected range of that video signal.

19. In combination with an electronic system for producing a composite picture from foreground and background video signals, the foreground signals representing respective color components of a foreground scene against a backing effectively illuminated with light which is predominantly confined to one of said colors and which contains an impurity of at least one other color; the improvement which comprises means for deriving a control signal which represents essentially a difference function at said foreground objects, and which represents a ratio function of said foreground video signals at unobstructed areas of the backing.

20. Combination according to claim 19 wherein said signal deriving means comprise means for discriminating first and second ranges of values of said foreground video signal for said other color, which ranges generally correspond to foreground objects and to unobstructed areas of the backing, respectively, and means for deriving said difference function control signal and said ratio function control signal in response to said respective first and second value ranges.

21. Combination according to claim 19 wherein said signal deriving means comprise means for discriminating first and second value ranges for said foreground video signal for said other color which are larger and smaller, respectively, than a selected value, and means for deriving said difference function control signal and said ratio function control signal in response to said first and second value ranges.

22. Combination according to claim 21 wherein said selected value corresponds to the content of light of said other color in backing illumination of at least normal brightness.

23. Combination according to claim 19 wherein said signal deriving means comprise means for discriminating first, second and third areas in which said foreground video signal for said other color represents light intensities larger than a first value corresponding generally to a normally bright level of backing illumination, between said first value and a second value corresponding to an abnormally low level of backing illumination, and less than said second value, respectively, and means for deriving said difference function control signal at said first and third areas and for deriving said ratio function control signal at said second area.

24. In a process for electronically combining foreground and background video signals, to produce a composite picture, said foreground signals representing respective color components of a foreground scene before a backing effectively illuminated with light predominantly confined to one of said colors and containing a minor proportion of at least one other color; the improvement comprising reducing the video signal for said other color by a value which varies automatically in direct proportion to the effective transparency of the foreground scene, and employing the so reduced video signal as said other color component of the foreground scene for producing the composite picture.

25. In a process for electronically combining foreground and background video signals to produce a composite picture, said foreground signals representing respective red, green and blue color components of a foreground scene against a blue backing, which process includes limiting the blue video signal to a value which exceeds the green video signal to an extent that permits substantial preservation of a light blue color that is present in the foreground scene; the method of suppressing blue light leaking from the backing, comprising allowing the blue video signal to exceed the green video signal only to substantially the extent that the green video signal exceeds the red video signal.

26. In a process for electronically combining foreground and background video signals to produce a composite picture, said foreground signals representing respective color components of a foreground scene before a backing effectively illuminated with light predominantly confined to one of said colors and containing a minor proportion of at least one other color, which process includes attenuating the background video signals in response to a control signal which normally represents substantially the difference of the foreground video signal for said one color minus the foreground video signal for said other color; the method of compensating intensity variations of the backing illumination, comprising modifying said control signal at backing areas substantially unobstructed by the foreground scene to represent approximately the ratio of the foreground video signal for said one color to the foreground video signal for said other color.

27. In a process for electronically combining foreground and background video signals to produce a composite picture, said foreground signals representing respective color components of a foreground scene before a backing effectively illuminated with light predominantly confined to one of said colors and containing a minor proportion of at least one other color; the improvement comprising attenuating the background video signals in response to a control signal which represents a ratio function of said foreground video signals at areas corresponding to unobstructed backing, and which represents a difference function of said foreground video signals at areas corresponding to foreground objects.

* * * * *